(12) United States Patent
Sipilä et al.

(10) Patent No.: US 7,489,657 B2
(45) Date of Patent: Feb. 10, 2009

(54) DETERMINATION AND USE OF ADAPTIVE THRESHOLDS FOR RECEIVED MESSAGES

(75) Inventors: Teemu Sipilä, Oulunsalo (FI); Tuomas Saukkonen, Oulu (FI)

(73) Assignee: Nokia Corporation, Espoo (FI)

( * ) Notice: Subject to any disclaimer, the term of this patent is extended or adjusted under 35 U.S.C. 154(b) by 501 days.

(21) Appl. No.: 11/347,655

(22) Filed: Feb. 3, 2006

(65) Prior Publication Data
US 2007/0183390 A1   Aug. 9, 2007

(51) Int. Cl.
*H04Q 7/00* (2006.01)
(52) U.S. Cl. .................. 370/329; 370/498; 370/500; 455/67.11; 455/501; 375/148
(58) Field of Classification Search ............... 370/329, 370/498, 500; 455/76.11, 501; 375/148
See application file for complete search history.

(56) References Cited

U.S. PATENT DOCUMENTS

| | | | | |
|---|---|---|---|---|
| 6,067,449 | A * | 5/2000 | Jager | 455/277.2 |
| 6,535,738 | B1 * | 3/2003 | Bomar et al. | 455/436 |
| 7,099,380 | B1 * | 8/2006 | Feng et al. | 375/150 |
| 7,139,274 | B2 * | 11/2006 | Attar et al. | 370/395.4 |
| 2002/0196752 | A1 * | 12/2002 | Attar et al. | 370/331 |
| 2004/0198274 | A1 * | 10/2004 | Lindenmeier | 455/130 |
| 2005/0123059 | A1 | 6/2005 | Harris et al. | 375/244 |
| 2005/0265249 | A1 | 12/2005 | Nagaraj | 370/252 |
| 2007/0253450 | A1 * | 11/2007 | Kuroda et al. | 370/500 |

FOREIGN PATENT DOCUMENTS

WO   WO-2004/068720 A2   8/2004
WO   WO-2004/088998 A2   10/2004

OTHER PUBLICATIONS

Philips, "On the decision threshold for detecting ACK/NACK messages," 3GPP TSG RAN WGI#26, R1-02-0823, Gyeongju, Korea, May 13-16, 2002.

* cited by examiner

*Primary Examiner*—Danh C Le
(74) *Attorney, Agent, or Firm*—Harrington & Smith, PC (57) ABSTRACT

A method is disclosed that includes measuring, during a measurement period, values corresponding to noise and interference signals received from a channel. The measurement period coincides with a period when no signal is transmitted on the channel. The method also includes determining one or more thresholds based upon the measured values. Second signals that correspond to a message are received on the channel. The message includes an indicator having a number of possible states. A value is determined corresponding to the indicator based upon the second signals. One of the possible states is assigned to the indicator of the received message based upon the one or more thresholds and the determined value.

43 Claims, 4 Drawing Sheets

FIG.4C

DETERMINATION AND USE OF ADAPTIVE THRESHOLDS FOR RECEIVED MESSAGES

TECHNICAL FIELD

This invention relates generally to wireless communication systems and, more specifically, relates to determining information in messages received over wireless communication systems.

BACKGROUND

There are times when user equipment, such as a cellular phone, is communicating with a number of cells in a cellular phone system. One such time is during soft handover, which is a process of transitioning from one cell to another. However, there are other times when a user equipment will communicate with a number of cells. The set of all cells that "listen" to the user equipment during these times is called the active set. The active set can change over time, such that new cells are added to the set and old cells removed from the set.

During this communication process, the user equipment will transmit signals on one or more uplink channels and receive signals on one or more downlink channels with the cells in the active set. There are a number of messages, such as Automatic Repeat reQuest (ARQ) messages and messages concerning power received by the cell, that cells will communicate to the user equipment using signals on downlink channels. These messages include indicators having a number of predetermined states. For instance, the ARQ message has an indicator having an ACK (acknowledge) state and a NACK (no acknowledge) state. The user equipment receives these messages with no knowledge of what messages were originally sent, and the user equipment must assign with a high probability one of the predetermined states to the indicator of the received message.

In some systems, this decision is easily made. For instance, systems exist where an indicator is transmitted using values of −1 or +1, corresponding to two states. When these values can be detected with the same reliability, if a received message has a value below zero, a first state is chosen for the indicator and if a received message has a value above zero, a second state is chosen for the indicator. In this case, zero is being used as a dividing line. Although there is a probability that a+1 will be sent and the user equipment will incorrectly assign a−1 to the indicator (and vice versa), this probability is low and decreases with increasing power of transmitting the message and its associated indicator. In other systems, pilot symbols are used such that the downlink channel has a known power, which helps in the decision process. In still other systems, the downlink channel always has a non-zero power, such that zero does not have to be detected. Zero is the absence of transmission on the downlink channel, and is called DTX (discontinuous transmission).

A problem with some systems is that downlink channels can send −1, zero (i.e., DTX), or +1. If −1 or +1 is transmitted, the power at which the value is transmitted is unknown. The downlink channels can be transmitted to a single user equipment from many cells at the same time during a soft handover, and the powers from each cell can be different and unknown. Furthermore, the −1 and the +1 might have to be detected with a different reliability, which means that the zero (i.e., DTX) is of limited use as a dividing line.

It would therefore be desirable to provide techniques that remedy these problems.

BRIEF SUMMARY

In an exemplary aspect of the invention, a method is disclosed that includes measuring, during a measurement period, values corresponding to noise and interference signals received from a channel. The measurement period coincides with a period when no signal is transmitted on the channel. The method also includes determining one or more thresholds based upon the measured values. Second signals that correspond to a message are received on the channel. The message includes an indicator having a number of possible states. A value is determined corresponding to the indicator based upon the second signals. One of the possible states is assigned to the indicator of the received message based upon the one or more thresholds and the determined value.

In another exemplary embodiment, an apparatus is disclosed that comprises a memory and a data processor coupled to the memory. The data processor is configured to execute a program of machine-readable instructions to perform operations. The operations include determining at least one threshold using values measured during a measurement period. The measured values correspond to noise and interference signals received from a channel. The measurement period coincides with a period when no signal is transmitted on the channel. Another operation includes assigning one of a number of possible states to an indicator that corresponds to a portion of a message received from second signals on the channel. The assignment uses the at least one threshold and a determined value corresponding to signals for the portion of the message.

In an additional embodiment, an apparatus includes means for measuring, during a measurement period, values corresponding to noise and interference signals received from a channel. The measurement period coincides with a period when no signal is transmitted on the channel. The apparatus further includes means for determining, using the measured values, at least one threshold. The apparatus also includes means for receiving on the channel second signals corresponding to a message, the message comprising an indicator having a plurality of possible states. The apparatus includes means for determining, using the second signals, a value corresponding to the indicator and means for assigning, using the at least one threshold and the determined value, one of the plurality of possible states to the indicator of the received message.

BRIEF DESCRIPTION OF THE DRAWINGS

The foregoing and other aspects of embodiments of this invention are made more evident in the following Detailed Description of Exemplary Embodiments, when read in conjunction with the attached Drawing Figures, wherein.

DETAILED DESCRIPTION OF EXEMPLARY EMBODIMENTS

An exemplary technology area for embodiments of the disclosed invention is a physical layer (e.g., Layer 1) of a wireless communication system. An exemplary embodiment includes a receiver algorithm mainly for 3G (third-Generation) user equipment, such as a cellular phone. An emphasis herein is placed on third-Generation Partnership Project (3GPP) communication systems, but there is no reason why the techniques disclosed herein would not work for other 3G-systems and other systems like Wide Local Area Networks (WLANs) and such with, e.g., a Hybrid Automatic Repeat reQuest (HARQ) feature.

3GPP Release6 contains a new feature for fast uplink packet transmission. The 3GPP specification calls the feature the enhanced uplink. A common popular name for the feature is High Speed Uplink Packet Access (HSUPA), which is the name that will be used herein. The HSUPA contains a new uplink transport channel called Enhanced Uplink-Dedicated Channel (E-DCH) to provide faster data transmission from the user equipment to the base station, called Node B. The E-DCH utilises HARQ, i.e., if the network informs the user equipment that the network did not receive the transmitted block, the user equipment will send the block again. There are three downlink signalling channels related to HSUPA, out of which the two called E-DCH Hybrid ARQ Indicator Channel (E-HICH) and E-DCH Relative Grant Channel (E-RGCH) are the ones that will discussed herein.

A basic idea in HSUPA is that the user equipment sends a block of data during a time period called TTI (Transmission Time Interval), to one or more receiving cells. As described above, the set of all listening cells is called the active set. Each cell in the active set can reply to the user equipment after a certain number of TTIs after the uplink E-DCH transmission has taken place. Of interest are two reply messages for the downlink channels, an ARQ message including an indicator having possible states of ACK and NACK, and a power reply message including an indicator having states UP, KEEP, and DOWN. The ARQ message is carried on E-HICH and the power message is carried on E-RGCH. Both of these reply messages include indicators having states that are mapped, e.g., to signal values −1, zero (i.e., DTX), or +1 when sent. For instance, the ARQ message includes an indicator that has states typically mapped to zero (e.g., NACK) or +1 (e.g., ACK), while the power message has an indicator that has states typically mapped to −1 (e.g., DOWN), zero (e.g., KEEP), and +1 (e.g., UP). However, the amplitude (or the power) of the transmitted reply message is not known and can change from time to time.

This is a new problem for the user equipment. As previously discussed, other channels have a known power (e.g., relative to a pilot), or have always a non-zero power (i.e., DTX does not have to be detected), or both −1 and +1 can be detected with the same reliability (i.e., zero can be used as a dividing line: if the received signal has a value that is below zero, decide −1, and if the value is above zero, decide +1.) In the case of the E-HICH and the E-RGCH, the −1 and +1 may not be detected with the same reliability, and the channels do not have a known power.

Figure 4A:
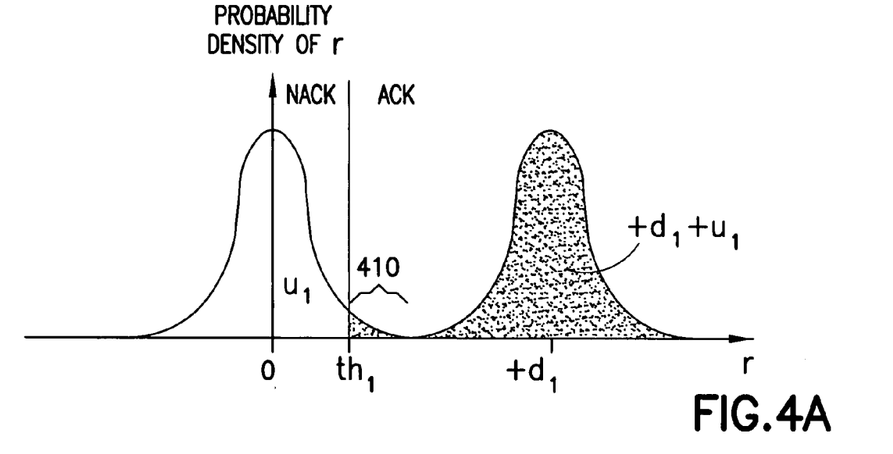
FIGS. 4A-4C illustrate probability densities of values for received signals with varying transmission power and unwanted signal variance.
Figure 4B:
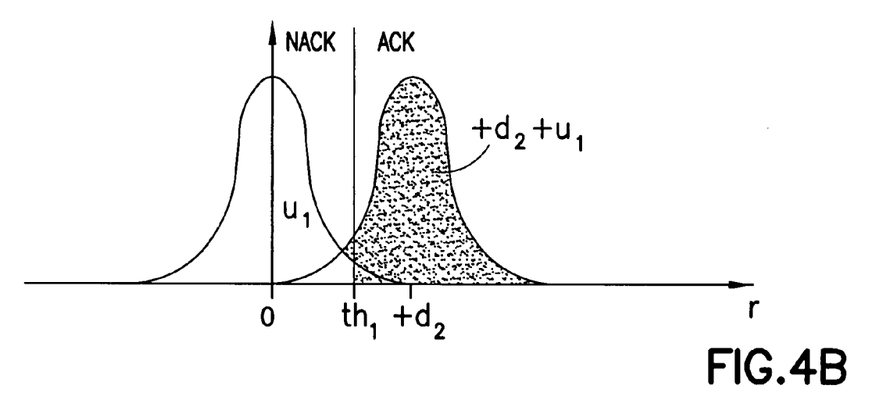
Figure 4C:
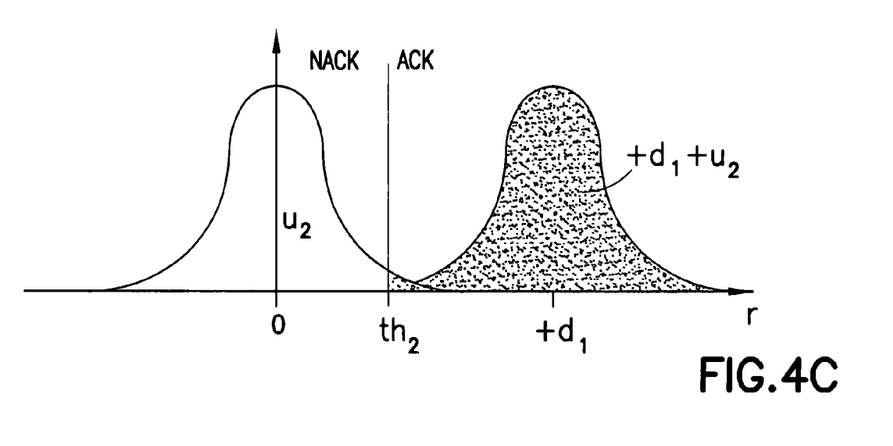

Examples of changing power of the transmitted signal and of changing variance of the DTX signal are illustrated in FIGS. 4A-4C. Referring now to FIG. 4A, an exemplary graph is shown of probability density of values for a received signal, r, which is received at a user equipment. The values for r at 0 (zero) and +d are values as transmitted from a cell in an active set for an indicator in a message. In this example, the message is an ARQ message having an indicator that has the states of NACK and ACK. NACK is transmitted as DTX (i.e., no signal, or zero) and ACK is transmitted with a value of +d. The d shown is a desired signal and the u is an unwanted signal (e.g., noise and interference), which yields the resultant probability density of d+u. As used herein, noise and interference includes any signal not part of the signal transmitted. In FIGS. 4A-4C, the probability densities of the unwanted signal, u, and the resultant signal, d+u, are densities that could be determined given a particular time period for reception for these signals. The probability densities are merely exemplary and used for exposition.

The probability densities shown in FIGS. 4A-4C are example densities that would occur over a period of time. Each of FIGS. 4A-4C illustrates a "snap shot" of communication at one specific time. A user equipment, when receiving an ARQ message, would have to determine which state (i.e., NACK or ACK) to assign to an indicator in the ARQ message. Thus, it would be beneficial for the user equipment to set the threshold, $th_1$, in order to determine whether a NACK or an ACK has been received, with an exemplary requirement being that the setting of the threshold should minimize the probability that a NACK is determined when an ACK was sent. In fact, it is beneficial to keep the probability that an ACK is determined when a NACK was sent close to or possibly below a desired value. This is valid in the example of FIGS. 4A-4C because NACK=DTX. In a more general case, another exemplary requirement is to keep the probability that a "something" other than DTX is determined when a DTX was sent close to or possibly below a desired value. The "something" could be any state assignable to an indicator.

In FIG. 4A, the desired signal is $d_1$ and the unwanted signal is $u_1$. The threshold, $th_1$, has been set to provide a certain probability that an ACK is determined when an NACK was sent. The probability that an ACK is determined when a NACK was sent is illustrated in FIG. 4A by reference number 410. Setting the threshold is described in more detail below. In FIG. 4B, shown at a second time, the power level (i.e., as indicated by $d_2$) used to transmit the ACK has decreased. In this example, the threshold, $th_1$, is not changed, as the threshold, $th_1$, should follow the variance of the unwanted signal, $u_2$. In FIG. 4B, the low transmission power (i.e., illustrated by $d_2$) at which the ACK signal is transmitted will cause a larger number of errors than would occur in the situation shown in FIG. 4A. This is true because the curve for the probability density $d_2+u_1$ overlaps the curve for the probability density of $u_1$ to a much larger degree than the probability density $d_1+u_1$ overlaps the curve for the probability density of $u_1$.

In FIG. 4C, variance of the unwanted signal, $u_2$, has increased relative to the variance of $u_1$, while the power of the desired signal remains as shown in FIG. 4A. Now, the threshold should be increased to be the threshold, $th_2$, in order to maintain the same probability that an ACK is determined when a NACK was sent. FIGS. 4A-4C illustrate an example with only two states, but three states would be similar (see, e.g., FIG. 3).

It should also be noted that in FIGS. 4A-4C, the probability density of the unwanted signal u is shown as having a mean of zero. This need not be the case, and the probability density of the unwanted signal u could have a non-zero mean.

Therefore, some adaptive threshold(s) should be used to determine which state has been communicated for an indicator of a message. The disclosed invention, among other things, provides techniques for adaptive threshold determination and use.

Figure 1:
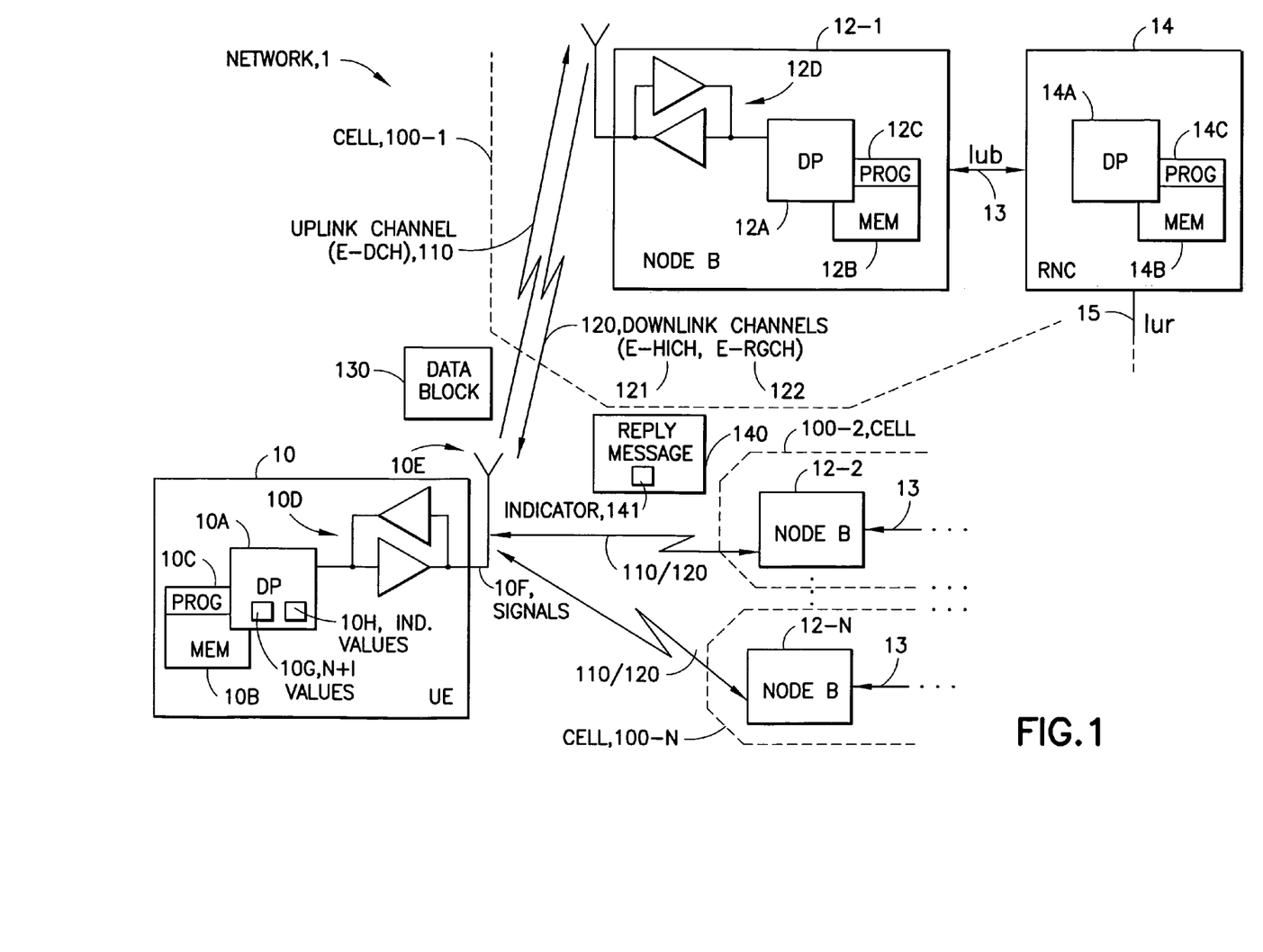
FIG. 1 is a block diagram of an exemplary network incorporated an exemplary embodiment.

Reference is made first to FIG. 1 for illustrating a simplified block diagram of various electronic devices that are suitable for use in practicing exemplary embodiments of the disclosed invention. In FIG. 1, a wireless network 1 is adapted for communication with a user equipment (UE) 10 via N Node Bs (e.g., base stations) 12-1 through 12-N. During handover, the UE 10 would typically communicate with a number of Node Bs 12. Each Node B 12 would serve one or more cells 100. In this example, cell 100-1 is served by Node B 12-1, cell 100-2 is served by Node B 12-2, and cell 100-N is served by Node B 12-N. However, this is just for ease of exposition. In a typical setup, a Node B 12 is an apparatus generally having several antennas (not shown) directed to different directions called sectors. These different sectors are the cells. Sometimes the term "cell" refers to the geographical area covered by the antenna, and sometimes "cell" refers to the apparatus dedicated to serve that geographical area. In this discussion, the latter definition is more applicable. Regardless, the Node B 12 typically gathers the information of all the physically closely spaced cells 100. So all information known in one cell 100 is also known by the other cells 100 in the same Node B 12, because these cells 100 are physically so close to each other.

In this context, it is probably more appropriate to describe the UE 10 communicating with a cell 100, rather than the UE 10 communicating with a Node B 12, because E-HICH and E-RGCH are transmitted from each cell 100. Also, the participants in the "active set" are cells 100, not Node Bs 12. Consequently, description herein about communications involving an active set will refer to communications between a cell 100 and a UE 10, although this is not a limitation on the disclosed invention.

Only a single Node B 12, i.e., Node B 12-1, is described in more detail herein, but the other Node Bs 12-2 through 12-N are assumed to be similar. The network 1 may include, connected to Node B 12-1, a Radio Network Controller (RNC) 14, which may be referred to as a serving RNC (SRNC). Furthermore, one RNC 14 can serve one or multiple Node Bs 12.

The UE 10 includes a data processor (DP) 10A, a memory (MEM) 10B that stores a program (PROG) 10C, and a suitable radio frequency (RF) transceiver 10D for bidirectional wireless communications with the Node Bs 12. Node B 12-1 includes a DP 12A, a MEM 12B that stores a PROG 12C, and a suitable RF transceiver 12D. The Node B 12-1 is coupled via a data path 13 (Iub) to the RNC 14 that also includes a DP 14A and a MEM 14B storing an associated PROG 14C. The RNC 14 may be coupled to another RNC (not shown) by another data path 15 (Iur). The PROG 10C is assumed to include program instructions that, when executed by the associated DP, enable the UE 10 to operate in accordance with exemplary embodiments of this invention.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 10A of the UE 10, or by hardware, or by a combination of software and hardware.

The MEMs 10B, 12B, and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, and 14A may be of any type suitable to the local technical environment, and may include one or more of general purpose computers, special purpose computers, microprocessors, digital signal processors (DSPs) and processors based on a multi-core processor architecture, as non-limiting examples.

In the example of FIG. 1, the UE 10 communicates one or more data blocks 130 on an uplink channel, E-DCH, 110 to one or more cells 100. The HSUPA transmission is discontinuous in nature. Transmission using HSUPA is performed using a packet switched service, meaning that data blocks 130 are transmitted in bursts. It follows that there will be several beginnings and ends of continuous transmission. While the UE 10 is transmitting, the cells 100 are typically listening on the uplink channel 110 and are not transmitting on the downlink channel(s) 120. The downlink channel(s) 120 include one or both of the E-HICH 121 and the E-RGCH 122.

In general, after the UE 10 transmits a data block 130, the cells 100 can respond on the downlink channel(s) 120 using one or more reply messages 140. As described above, an ARQ message (e.g., as reply message 140) having an indicator 141 with possible states of ACK or NACK is typically carried on E-HICH 121, and a power message (e.g., as reply message 140) having an indicator 141 with possible states of UP, KEEP, or DOWN is carried on E-RGCH 122. The states for these indicators are typically mapped to selected values from the values of -1, zero, and +1. An indicator is any definable portion of a message between a transmitter and receiver, where the definable portion can be assigned multiple states. Note also that a reply message 140 can include only the indicator 141, although generally a reply message 140 will include more information than just the indicator 141.

As the -1 and +1 may not be detected with the same reliability, and the downlink channels 120 do not have a known power, the UE 10 measures during a measurement period noise and interference (N+I) values 10G corresponding to signals 10F received on the downlink channel(s) 120. It should be noted that the noise and interference values 10G (and indicator values 10H) may also be stored in MEM 10B. The measurement period is predetermined to coincide with a period when so signal (i.e., zero, also called DTX herein) is transmitted on the downlink channel(s) 120. The noise and interference values 10G should therefore correspond to noise and interference signals on the downlink channel(s) 120. Using a statistical analysis described in more detail below, the UE 10 during the measurement period will use the noise and interference values 10G to determine one or more thresholds (not shown in FIG. 1, but see FIG. 3 for illustrations of thresholds) to be applied to the indicators 141 for the reply messages 140 received on the E-HICH 121 and the E-RGCH 122. The indicator values 1 OH are determined by the UE 10 from signals corresponding to the indicators 141. The UE 10 uses the thresholds and the indicator values 10H to assign one of a number of possible states to each of the indicators 141. This is also described in more detail below.

Figure 2:
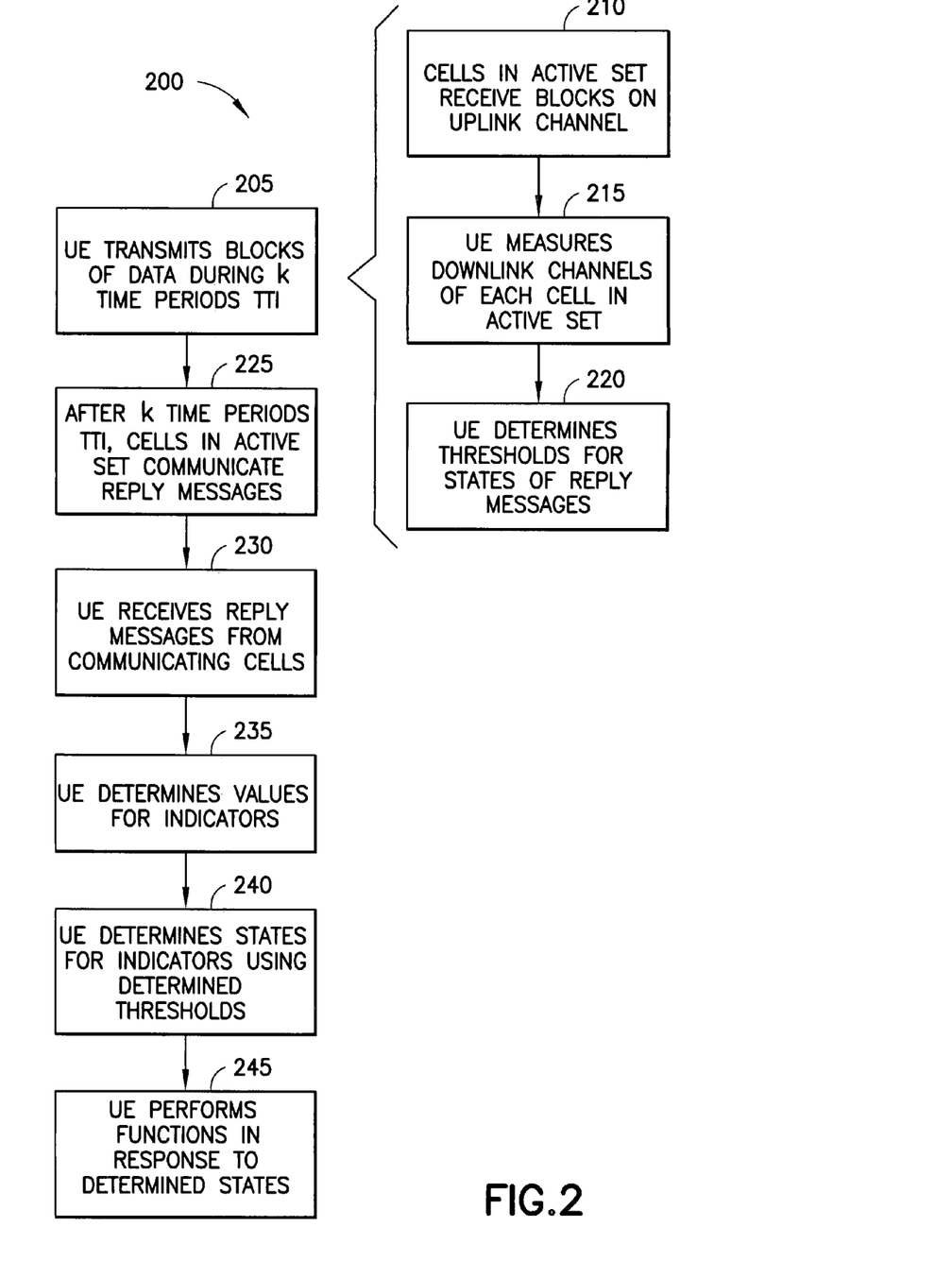
FIG. 2 is a flow chart of an exemplary method for determining and using adaptive thresholds for indicators of received reply messages.

Referring now to FIG. 2 with appropriate reference to FIG. 1, a flow chart is shown of an exemplary method 200 for determining and using adaptive thresholds for received reply messages. Method 200 is performed by the UE 10 and Node Bs 12 in network 1.

In step 205, the UE 10 transmits one or more data blocks 130 to the cells 100 in the active set. In FIG. 1, the active set is for instance the set of N cells 100. Assume the UE 10 starts to transmit on the uplink channel, E-DCH, 110 using, e.g., the E-DCH Dedicated Physical Data Channel (E-DPDCH) to transmit data and the E-DCH Dedicated Physical Control Channel (E-DPCCH) to transmit control information. The E-DPDCH and E-DPCCH are physical channels of the uplink channel 110. It is assumed in this example that this transmission occurs, e.g., at TTI m and occurs for k time periods (i.e., k TTIs). During the k TTIs, steps 210, 215, and 220 are performed. After the k TTIs, steps 225 through 245 are performed. In step 210, the cells 100 (e.g., Node Bs 12 in the cells 100) in the active set receive the data blocks on the uplink channel 110.

It is known that on the downlink channels 120 (e.g., E-HICH 121 and the E-RGCH 122) responses (e.g., reply messages 140) will be received beginning from TTI m+k, where k includes the number of TTIs that is required for processing at the Node Bs 12. Such reply messages 140 typically contain an indicator 141 (e.g., for ACK/NACK) and may include items such as a relative grant. It follows that starting from about TTI m, only DTX (i.e., no signal, only noise and interference) will be received in the downlink channels 120 for about k TTIs. Thus, a measurement period in this example is selected that coincides with a period when no signal is transmitted on the downlink channel 120. For this measurement period, the UE 10 uses the received signals in a "pilot-signal"-fashion, because the signals are known (i.e., the signals should be zero). In general, when there is a TTI when the UE 10 does not transmit anything, it is known that the TTI that is coming after k TTIs of transmission by the UE 10 will be empty and this time period will be used for noise and interference variance measurement. The noise and interference variance measurement is used to determine thresholds that are subsequently used to assign the indicator 141 to one of a number of predetermined states. This measurement technique may be performed, in some implementations, if the UE 10 has a channelization code and 40-bit signature codes for the E-HICH 121 and E-RGCH 122 allocated to the UE 10. The UE 10 can determine if these codes are allocated to the UE 10. For longer time periods when there is no transmission, the codes might be allocated to another UE 10 and in those cases the techniques may not be applicable. But before the transmission of the UE 10 begins, the UE 10 will get the needed codes.

Figure 3:
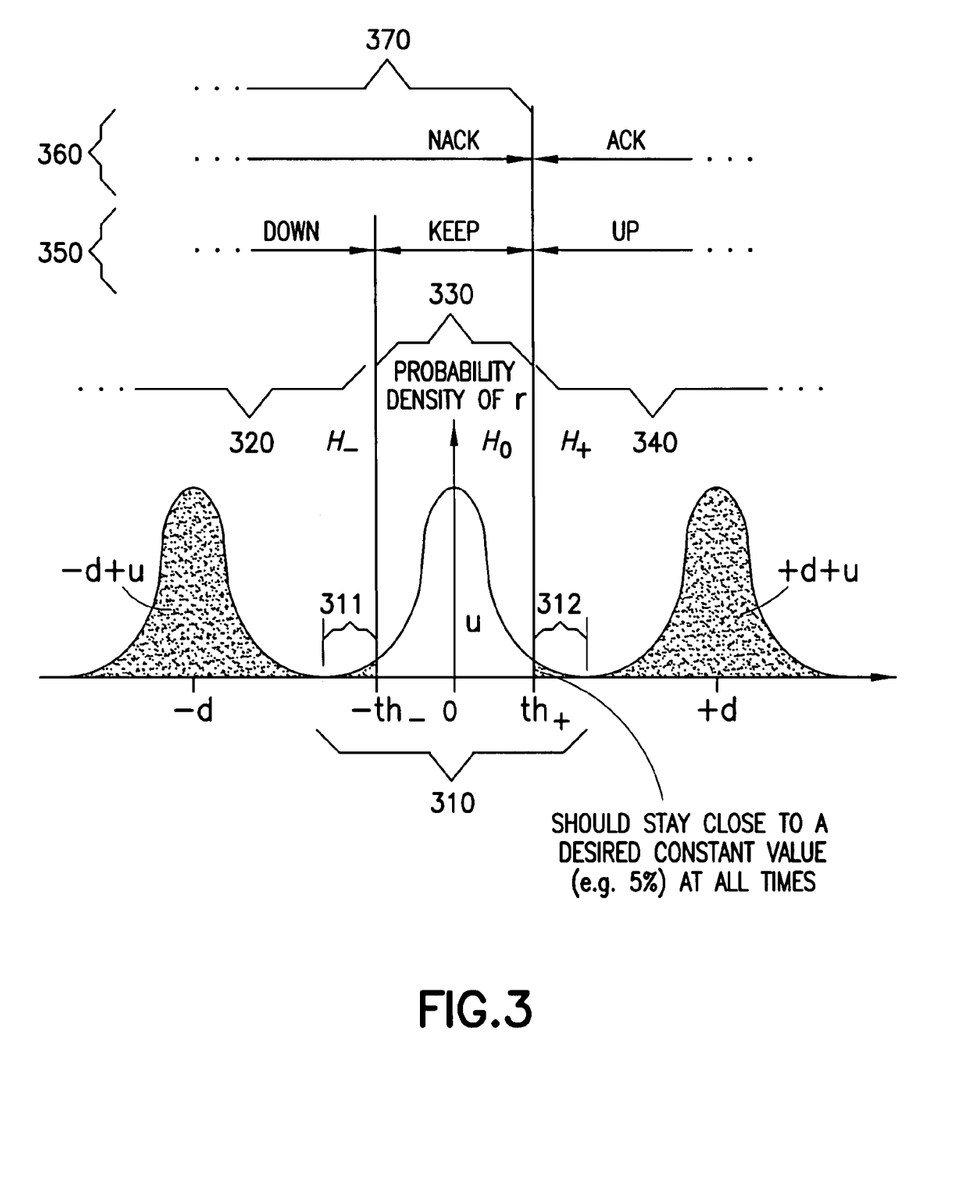
FIG. 3 is an exemplary graph of probability density of values for a received signal.

During the measurement period, the received signal (e.g., comprising noise and interference) is measured (step 215) for all downlink channels 120 for cells 100 (e.g., from corresponding Node Bs 12) in the active set, and the thresholds for each cell 100, and for both E-HICH 121, and E-RGCH 122 are adjusted based on these measurements (step 220). It should be noted that the PROG 10C in the UE 10 can perform steps 215 and 220. As another illustration, another program in the UE 10 performs step 215 to determine the noise and interference values 10G measured during step 215, and the PROG 10C determines the thresholds in step 220. As yet another example, the transceiver 10D produces the noise and interference values 10G, which are passed to the DP 10A. Exemplary thresholds are illustrated in FIG. 3, described below. In one embodiment, it is transceiver 10D determines the noise and interference values 10G, because the noise and interference values 10G are determined from the "plain" signal that is received from the radio channel without any further processing. In another embodiment, which is more typical, the received signals during the measurement period will be correlated by the program 10C using a 40-bit signature to determine the noise and interference values 10G. Note that correlation with a 40-bit signature will also be performed by program 10C for the actual data (e.g., the reply message 140) following the measurement period.

In one exemplary embodiment, the measurements are used in step 220 to adjust the thresholds as follows. There is one threshold for each cell 100 in the active set. Before any transmission or reception takes place, these thresholds may have some predefined initial values. When the actual transmission takes place, it is very likely that these thresholds may not be optimal, or even satisfactory. Let P(ACK|DTX) be the probability that ACK is detected by the UE 10, given that DTX was transmitted in the cell. It should be noted that the transmission of DTX is a "transmission" of the value zero such that no transmission takes place. There is some desired level at which this probability should be. It is assumed that the received signal r (e.g., only noise and interference during the measurement period) can be modelled as a Gaussian random variable. It is known that by selecting the detection threshold to be th, then $$P(ACK|DTX) = P(r > th|DTX) \quad (1)$$
$$= \int_{th}^{\infty} f(r|DTX)dr$$
$$= 1 - \int_{-\infty}^{th} f(r|DTX)dr,$$

where $f(r|DTX)$ is the probability density function of the received signal r, given that DTX was transmitted and $$\int_{-\infty}^{th} f(r|DTX)dr = F(th|DTX) = P(r < th|DTX)$$

is the cumulative distribution function of the received signal.

If the desired value for P(ACK|DTX) would be for example five percent, the threshold th should be equal to $$th = 1.645\sigma, \quad (2)$$

where $\sigma$ is the standard deviation of r. The relationship between the desired P(ACK|DTX) and the corresponding threshold is determined by the cumulative distribution function of the normal distribution, which is a well-known function.

In an exemplary embodiment, estimation of $\sigma$ is performed during the TTIs when it is certain that DTX is transmitted (step 215), such that the measurement will be of noise and interference. When $\sigma$ is estimated, Equation 2 is used to compute the threshold. Equation 2 naturally applies if the desired P(ACK|DTX) is five percent. For other target probabilities, the coefficient (here 1.645) should be different.

The standard deviation $\sigma$ of the received signal can be estimated using for example using the following formula for estimating the standard deviation of a zero-mean random variable from a sample of data:

$$\hat{\sigma} = \sqrt{\frac{1}{n-1} \sum_{i=1}^{n} r_i^2}, \quad (3)$$

where $\hat{\sigma}$ denotes that it is an estimate of $\sigma$, n is the number of samples and $r_i$ is the received signal value at time instant i.

Now that step 220 has been described in detail, in step 225, which occurs typically after k TTIs, the cells 100 in the active set communicate reply messages 140 over the downlink channels 140. In step 230, the UE 10 receives reply messages 140 from the communicating cells 100 in the active set. In step 235, the UE determines indicator values 10H corresponding to indicator 141 in the reply messages 140. In step 240, the UE 10 determines states for indicators 141 using the thresholds and the measured noise and interference values 10G, as described in more detail in reference to FIG. 3. The PROG 10C in UE 10 would typically would perform steps 235 and 240, however another program could determine the indicator values 10H and then give the indicator values 10H to the PROG 10C, which would perform step 240.

In step 245, the UE 10 performs functions in response to the determined states. For instance, if the determined state is a NACK, the UE 10 could resend some or all of the data block 130. As another example, if the determined state is an UP, the UE 10 could increase power on the uplink channel 110.

Referring now to FIG. 3 with appropriate reference to preceding figures, an exemplary graph is shown of probability density of values for a received signal, r. The values for r at −d, 0 (zero), and +d are values as transmitted from the cells 100 (and associated Node Bs 12) for the states of an indicator 141. The curve shown illustrates the probability for particular values to be received at the UE 10. The d shown is a desired signal and the u is an unwanted signal (e.g., noise and interference), which yields the resultant probability densities of −d+u and d+u.

In step 225 of FIG. 2, the UE 10 would receive values of the received signal r that fall into an exemplary range indicated by reference numeral 310 and by u. Using the techniques described above in reference to step 220 of FIG. 2, the UE 10 (e.g., PROG 10C) determines the thresholds $th_-$ and $th_+$ to so that P(ACK|DTX) stays close to a desired constant value, e.g., of five percent. The reference numeral 312 indicates P(ACK|DTX), the probability that ACK is detected by the UE 10, given that DTX was transmitted by the cell. It is noted that NACK in this example is DTX, although this need not be the case. For instance, NACK could be sent as −1 and ACK sent as +1. Reference numeral 312 also indicates P(UP|KEEP) (where KEEP is DTX in this example), the probability that UP is detected by the UE 10, given that KEEP was transmitted by the cell. The reference numeral 311 indicates P(DOWN|KEEP), the probability that DOWN is detected by the UE 10, given that KEEP (where KEEP is DTX) was transmitted by the cell. The thresholds $th_-$ and $th_+$ then define three regions: region $H_-$ 320, for values of r less than $th_-$; region $H_0$ 330, for values of r between and equal to $th_-$ $_{and\ th+}$; and region $H_+$ 340, for values of r greater than $th_+$.

Note that $|th_-|$ may not be equal to $|th_+|$. For example, it might be required that P(UP|KEEP) is five percent, but P(DOWN|KEEP) is 0.2 percent. In general, the desired error probabilities to "the left" (e.g., $th_-$) and to "the right" (e.g., $th_+$) can be different. In the example of Equation (2) for a Gaussian distributed unwanted signal, this would be seen so that the coefficient (1.645 in the example) is different when computing $th_+$ than when computing $th_-$.

It should be noted that it is not necessary to estimate or to determine the probability density of the unwanted signal. However, some properties of the probability density of the unwanted signal, u, have to be estimated. One can, for example, estimate the standard deviation, variance, which is the square of the standard deviation, or power. Any one or more of these may in turn be used when computing the threshold(s). Another property of a probability density function (and its distribution) would be for example the mean. This invention could be formulated so that the disclosed invention covers estimating whatever properties of the distribution of the unwanted signal, u, can be used. The estimation of the variance is one example. In the example, it was assumed that the distribution of u has a zero-mean, but in all applications this might not be true and also the mean should be estimated. How many samples are needed to get an accurate estimate for, e.g., the standard deviation (and thus the threshold) depend on what is the required or desired accuracy level of the product using the invention. Naturally, more samples mean a more accurate estimate, but there is no clearly required number of samples in order to have a sufficient number of samples. The estimate also depends on the prevailing noise and interference conditions. In an "easy" environment (e.g. slow UE 10 speed, line of sight to the base station/Node B 12, no other users nearby, etc.) a good estimate can be achieved with a low number of samples. By contrast, in a "tough" environment more samples would be needed to achieve the same performance in estimation. But in general, aspects of the disclosed invention may be applied with any number of samples.

An indicator 141 for a power reply message (e.g., as a reply message 140) would correspond to the states of DOWN, KEEP, and UP. When transmitted, the indicator 141 would have the possible values of −d, 0 (zero), and +d. The reference numeral 350 indicates how values received by the UE 10 of the indicator 141 would be assigned the states of DOWN, KEEP, and UP based on the thresholds $th_-$ and $th_+$: values in the region 320 are assigned to the state DOWN; values in the region 330 are assigned to the state KEEP; and values in the region 340 are assigned to the state UP.

Another example is shown of an indicator 141 for an ARQ reply message (e.g., as a reply message 140), where the indicator 141 would correspond to the states of NACK and ACK. When transmitted, the indicator 141 would have the possible values of 0 (zero) and +d. The reference numeral 360 indicates how values received by the UE 10 of the indicator 141 would be assigned the states of NACK and ACK based on the threshold $th_+$: values in the region 370 (including regions 330 and 320) are assigned to the state NACK; and values in the region 340 are assigned to the state ACK. It is noted that only the $th_+$ need be determined for the indicator 141 having the states of NACK and ACK in this exemplary embodiment. Furthermore, the assignments in FIG. 3 are merely exemplary. For instance, values in the region 370 (including regions 330 and 320) can be assigned to the state ACK; and values in the region 340 could be assigned to the state NACK.

It is noted that advantages of the exemplary embodiments disclosed herein include, but are not limited to, the following: less power is needed for the E-HICH 121 and E-RGCH 122 to meet performance targets; exemplary embodiments take into account the different interference and channel conditions from different cells; and the probability of erroneously detecting a DTX to be an ACK can be decreased, while there is no increase in the probability of erroneously detecting an ACK to be a NACK.

It might be possible that a system will allow the network 1 not to allocate all the HARQ processes under a certain spreading code to one UE 10. For example, the network 1 might be allowed, out of total 8 HARQ processes, give one UE 10 processes numbered 1, 3, 5, and 7, and the processes numbered 2, 4, 6, and 8 would be used by another UE 10. If this would happen, the techniques above could still be used. The techniques for a single UE 10 would just have to take into account that the measurement of the noise and interference variance cannot take place during the TTIs that belong to a HARQ-process that is not allocated to the UE 10.

In general, the various embodiments described herein may be implemented in hardware (e.g., special purpose circuits, logic, integrated circuits, and programmable logic devices), software (e.g., including firmware) or any combination thereof. For example, some aspects may be implemented in hardware, while other aspects may be implemented in software which may be executed by a Digital Signal Processor (DSP) (e.g., DP 10A), although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, or some combination thereof.

Embodiments herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Embodiments herein may be implemented as a signal bearing medium tangibly embodying a program of machine-readable instructions executable by processor such as the DP 10A to perform operations described herein. For instance, the operations could include determining one or more thresholds using values measured during a measurement period, and assigning one of a number of possible states to an indicator that corresponds to a portion of a message received from signals on a channel. The signal bearing medium could be part of memory MEM 10B, a digital versatile disk (DVD), compact disk (e.g., CDROM), memory stick, or any other short- or long-term memory. The signal bearing medium also could be a transferal medium such as radio frequency signals, network connections, and the like. It should also be noted that embodiments herein could be executable on multiple processors coupled to one or multiple memories.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For instance, the measurement periods described above can take place whenever no signal is transmitted on the downlink channel 120 used to determine the thresholds and need not necessarily take place at the times indicated. Further, messages other than ARQ and power messages may be used. Additionally, messages with indicators having two states could be transmitted using +d and −d, +d and DTX, or −d and DTX. Nonetheless, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A method comprising:
during a measurement period, measuring values with a receiving apparatus, the measured values, corresponding to noise and interference signals received from a channel, wherein the measurement period coincides with a period when no signal is transmitted on the channel;
determining at least one threshold based upon the measured values;
receiving on the channel second signals corresponding to a message, the message comprising an indicator having a plurality of possible states;
determining a value corresponding to the indicator based upon the second signals; and
assigning one of the plurality of possible states to the indicator of the received message based upon the at least one threshold and the determined value.

2. The method of claim 1, wherein determining at least one threshold further comprises determining at least one property of a probability density corresponding to the measured values and using the at least one property when determining the at least one threshold.

3. The method of claim 2, wherein only the at least one property and not the probability density is determined.

4. The method of claim 2, further comprising determining the probability density corresponding to the measured values.

5. The method of claim 2, wherein the at least one property comprises at least one of standard deviation, variance, power, and mean.

6. The method of claim 1, wherein one of the possible states corresponds to no signal being transmitted on the channel.

7. The method of claim 1, further comprising performing at least one function in response to the assigned state.

8. The method of claim 1, wherein:
the plurality of states is two states;
the at least one threshold is a single threshold; and
determining at least one threshold further comprises:
determining at least one property of a probability density corresponding to the measured values; and
using the at least one property, setting the single threshold such that a probability that a first of the two states is detected when a second of the two states was transmitted is a predetermined amount, wherein the second state corresponds to no signal being transmitted on the channel.

9. The method of claim 8, wherein:
the at least one property comprises a standard deviation of the probability density; and
setting the single threshold further comprises multiplying the standard deviation by a coefficient, the coefficient determined such that the probability that the first state is detected when the second state was transmitted is the predetermined amount.

10. The method of claim 8, wherein the first state corresponds to ACK (acknowledge) and the second state corresponds to NACK (no acknowledge), wherein the ACK corresponds to a value of +d when transmitted.

11. The method of claim 8, wherein the first state corresponds to NACK (no acknowledge) and the second state corresponds to ACK (acknowledge), and wherein the NACK corresponds to a value of either +d or −d when transmitted.

12. The method of claim 1, wherein:
the plurality of states is three states;
the at least one threshold is two thresholds; and
determining at least one threshold further comprises:
determining at least one property of a probability density corresponding to the measured values;
using the at least one property, setting a first of the two thresholds such that a probability that a first of the three states is detected when a second of the three states was transmitted is a first predetermined amount, wherein the second state corresponds to no signal being transmitted on the channel; and
using the at least one property, setting a second of the two thresholds such that a probability that a third of the three states is detected when the second state was transmitted is a second predetermined amount.

13. The method of claim 12, wherein:
the at least one property comprises a standard deviation of the probability density; and
setting a first of the two thresholds further comprises multiplying the standard deviation by a first coefficient, the first coefficient determined such that the probability that the first state is detected when the second state was transmitted is the first predetermined amount; and
setting a second of the two thresholds further comprises multiplying the standard deviation by a second coefficient, the second coefficient determined such that the probability that the third state is detected when the second state was transmitted is the second predetermined amount.

14. The method of claim 13, wherein the first and second coefficients are different.

15. The method of claim 13, wherein the first and second coefficients are the same.

16. The method of claim 12, wherein the first state corresponds to one of {DOWN, KEEP, and UP}, the second state corresponds to another of {DOWN, KEEP, and UP}, and the third state corresponds to a third of {DOWN, KEEP, and UP}, and wherein each of the first, second, and third states is unique.

17. The method of claim 16, wherein each of {DOWN, KEEP, and UP} correspond to a unique one of the values {+d, zero, and −d } when transmitted.

18. The method of claim 1, wherein:
the channel is a downlink channel;
the method further comprises transmitting at least one data block over an uplink channel, the transmission of the at least one data block taking a plurality of Transmission Time Intervals (TTIs); and
the measurement period corresponds to at least a portion of a TTI occurring after the plurality of TTIs.

19. The method of claim 1, wherein:
the channel is one of a plurality of channels; and
the method further comprises performing measuring values, determining at least one threshold, receiving, determining a value, and assigning for each of the plurality of channels.

20. The method of claim 19, wherein each of the plurality of channels is received in a network from a cell of an active set.

21. The method of claim 1, wherein:
the channel is an Enhanced Dedicated Channel (E-DCH) Hybrid ARQ Indicator Channel (E-HICH);
the method further comprises transmitting a data block over an E-DCH;
the message comprises an Automatic Repeat reQuest (ARQ) message; and
the plurality of possible states are the states of ACK (acknowledge) and NACK (no acknowledge).

22. The method of claim 1, wherein:
the channel is an Enhanced Dedicated Channel (E-DCH) Relative Grant Channel (E-RGCH);
the method further comprises transmitting a data block over an E-DCH;
the message comprises a power message; and
the plurality of possible states are UP, KEEP, and DOWN.

23. An apparatus comprising:
a memory; and
a data processor coupled to the memory, the data processor configured to execute a program of machine-readable instructions to perform the operations of:
determining at least one threshold using values measured during a measurement period, the measured values corresponding to noise and interference signals received from a channel, wherein the measurement period coincides with a period when no signal is transmitted on the channel; and
assigning one of a plurality of possible states to an indicator that corresponds to a portion of a message received from second signals on the channel, the assigning using the at least one threshold and a determined value corresponding to signals for the portion of the message.

24. The apparatus of claim 23, wherein the apparatus is formed at least in part on an integrated circuit.

25. The apparatus of claim 23, wherein the operations further comprise during the measurement period, measuring the values corresponding to noise and interference signals received from the channel.

26. The apparatus of claim 23, wherein one of the possible states corresponds to no signal being transmitted on the channel.

27. The apparatus of claim 23, wherein:
the plurality of states is two states;
the at least one threshold is a single threshold; and
the operation of determining at least one threshold further comprises the operations of:
determining at least one property of a probability density corresponding to the measured values; and
using the at least one property, setting the single threshold such that a probability that a first of the two states is detected when a second of the two states was transmitted is a predetermined amount, wherein the second state corresponds to no signal being transmitted on the channel.

28. The apparatus of claim 27, wherein the first state corresponds to NACK (no acknowledge) and the second state corresponds to ACK (acknowledge), and wherein the NACK corresponds to a value of either +d or −d when transmitted.

29. The apparatus of claim 23, wherein:
the plurality of states is three states;
the at least one threshold is two thresholds; and
the operation of determining at least one threshold further comprises the operations of:
determining at least one property of a probability density corresponding to the measured values;
using the at least one property, setting a first of the two thresholds such that a probability that a first of the three states is detected when a second of the three states was transmitted is a first predetermined amount, wherein the second state corresponds to no signal being transmitted on the channel; and using the at least one property, setting a second of the two thresholds such that a probability that a third of the three states is detected when the second state was transmitted is a second predetermined amount.

30. The apparatus of claim 29, wherein the first state corresponds to one of {DOWN, KEEP, and UP}, the second state corresponds to another of {DOWN, KEEP, and UP}, and the third state corresponds to a third of {DOWN, KEEP, and UP}, and wherein each of the first, second, and third states is unique.

31. The apparatus of claim 23, wherein:
the channel is a downlink channel;
the operations further comprise transmitting at least one data block over an uplink channel, the transmission of the at least one data block taking a plurality of Transmission Time Intervals (TTIs); and
the measurement period corresponds to at least a portion of a TTI occurring after the plurality of TTIs.

32. The apparatus of claim 23, wherein:
the channel is an Enhanced Dedicated Channel (E-DCH) Hybrid ARQ Indicator Channel (E-HICH);
the operations further comprise transmitting a data block over an E-DCH;
the message comprises an Automatic Repeat reQuest (ARQ) message; and
the plurality of possible states are the states of ACK (acknowledge) and NACK (no acknowledge).

33. The apparatus of claim 23, wherein:
the channel is an Enhanced Dedicated Channel (E-DCH) Relative Grant Channel (E-RGCH);
the operations further comprise transmitting a data block over an E-DCH;
the message comprises a power message; and
the plurality of possible states are UP, KEEP, and DOWN.

34. An apparatus comprising:
means for measuring, during a measurement period, values corresponding to noise and interference signals received from a channel, wherein the measurement period coincides with a period when no signal is transmitted on the channel;
means for determining, using the measured values, at least one threshold;
means for receiving on the channel second signals corresponding to a message, the message comprising an indicator having a plurality of possible states;
means for determining, using the second signals, a value corresponding to the indicator; and
means for assigning, using the at least one threshold and the determined value, one of the plurality of possible states to the indicator of the received message.

35. The apparatus of claim 34, wherein:
the plurality of states is two states;
the at least one threshold is a single threshold; and
the means for determining at least one threshold further comprises:
means for determining at least one property of a probability density corresponding to the measured values; and
means using the at least one property for setting the single threshold such that a probability that a first of the two states is detected when a second of the two states was transmitted is a predetermined amount, wherein the second state corresponds to no signal being transmitted on the channel.

36. The apparatus of claim 34, wherein:
the plurality of states is three states;
the at least one threshold is two thresholds; and
the means for determining at least one threshold further comprises:
means for determining at least one property of the probability density for the measured values;
means using the at least one property for setting a first of the two thresholds such that a probability that a first of the three states is detected when a second of the three states was transmitted is a first predetermined amount, wherein the second state corresponds to no signal being transmitted on the channel; and
means using the at least one property for setting a second of the two thresholds such that a probability that a third of the three states is detected when the second state was transmitted is a second predetermined amount.

37. A computer program product comprising program instructions embodied on a tangible computer-readable medium, execution of the program instructions resulting in operations comprising:
during a measurement period, measuring values corresponding to noise and interference signals received from a channel, wherein the measurement period coincides with a period when no signal is transmitted on the channel;
determining at least one threshold based upon the measured values;
receiving on the channel second signals corresponding to a message, the message comprising an indicator having a plurality of possible states;
determining a value corresponding to the indicator based upon the second signals; and
assigning one of the plurality of possible states to the indicator of the received message based upon the at least one threshold and the determined value.

38. The computer program product of claim 37, wherein one of the possible states corresponds to no signal being transmitted on the channel.

39. The computer program product of claim 37, further comprising the operation of performing at least one function in response to the assigned state.

40. The computer program product of claim 39, wherein:
the plurality of states is two states;
the at least one threshold is a single threshold; and
the operation of determining at least one threshold further comprises the operations of:
determining at least one property of a probability density corresponding to the measured values; and
using the at least one property, setting the single threshold such that a probability that a first of the two states is detected when a second of the two states was transmitted is a predetermined amount, wherein the second state corresponds to no signal being transmitted on the channel.

41. The computer program product of claim 40, wherein:
the at least one property comprises a standard deviation of the probability density; and
setting the single threshold further comprises multiplying the standard deviation by a coefficient, the coefficient determined such that the probability that the first state is detected when the second state was transmitted is the predetermined amount.

42. The computer program product of claim 40, wherein the first state corresponds to ACK (acknowledge) and the second state corresponds to NACK (no acknowledge), wherein the ACK corresponds to a value of +d when transmitted.

43. The computer program product of claim 40, wherein the first state corresponds to NACK (no acknowledge) and the second state corresponds to ACK (acknowledge), and wherein the NACK corresponds to a value of either +d or −d when transmitted.

* * * * *